United States Patent
Corder et al.

(12) 
(10) Patent No.: US 6,568,495 B1
(45) Date of Patent: May 27, 2003

(54) AUTOMOTIVE VEHICLE HOOD SYSTEM

(75) Inventors: George A. Corder, Romulus, MI (US); James E. Tousignant, New Boston, MI (US)

(73) Assignee: ASC Incorporated, Southgate, MI (US)

( * ) Notice: Subject to any disclaimer, the term of this patent is extended or adjusted under 35 U.S.C. 154(b) by 0 days.

(21) Appl. No.: 09/631,432

(22) Filed: Aug. 2, 2000

(51) Int. Cl.⁷ .............................. B62D 25/10; B60J 7/00
(52) U.S. Cl. .................... 180/69.2; 296/76; 296/107.08
(58) Field of Search .............................. 180/69.2, 69.21, 180/69.24; 292/DIG. 14, DIG. 5; 296/146.12, 100.08, 76, 107.08

(56) References Cited

U.S. PATENT DOCUMENTS

| | | | | |
|---|---|---|---|---|
| 1,097,455 A | * | 5/1914 | Marshall | 180/69.2 |
| 1,725,158 A | * | 8/1929 | Pinkerton | 180/289 |
| 2,311,965 A | | 2/1943 | Reynolds | |
| 2,620,889 A | | 12/1952 | McCormick | |
| 2,672,942 A | | 3/1954 | Bayley | |
| 2,737,254 A | * | 3/1956 | Bayley | 276/96 |
| 3,747,271 A | * | 7/1973 | Adamski | 49/340 |
| 4,125,170 A | * | 11/1978 | Botz | 16/267 |
| 4,206,944 A | * | 6/1980 | Kumagai et al. | 296/76 |
| 4,702,094 A | * | 10/1987 | Peterson | 180/289 |
| 4,839,941 A | * | 6/1989 | Orlando | 16/361 |
| 5,743,587 A | | 4/1998 | Alexander et al. | |
| 5,772,274 A | | 6/1998 | Tokarz | |
| 5,785,375 A | | 7/1998 | Alexander et al. | |
| 6,052,870 A | * | 4/2000 | Hagenlocher et al. | 16/347 |
| 6,067,021 A | | 5/2000 | Huber | |
| 6,217,108 B1 | * | 4/2001 | Sasaki | 296/194 |

OTHER PUBLICATIONS

Motor City Dream Cars, L.L.C., "Buick Lacrosse Slide Show and Concept Data Sheet"; copyright 1999–2000; accessed at www.motorcitydreacars.com; May 7, 2002.*
San Jose Mercury News, Jan. 10, 2000, Concept Vehicles Unveiled at Detroit Auto Show Big Three Carmakers Diverge in Radical Ways; second page; 2 pages.*
Sketch of Vehicle Hood System (believed to have been given to inventors from customer prior to Aug. 2, 2000).
Detroit Free Press, Jan. 10, 2000, "DC's High Hopes Ride on Minivan Debut Today", front page.
Detroit Free press, Jan. 10, 2000, "GM Shows Off 5 Far--From--Stodgy Vehicles", p. 6A.
http://www.auto.com/2000autoshow/slideshow/buick_lacrosse_con/photo10.htm, Jun. 3, 2000, 1 page.
http://www.califmall.com/HotCarsTem96.html, Jul. 11, 2000, 4 pages.
http://www.cars-on-line.com/66lincoln1260.html, May 18, 2000, 2 pages.

* cited by examiner

*Primary Examiner*—Brian L. Johnson
*Assistant Examiner*—Gerald Klebe
(74) *Attorney, Agent, or Firm*—Harness, Dickey & Pierce, P.L.C.

(57) ABSTRACT

An automotive vehicle system employs a generally rigid body panel which is movable in an automatic manner from a generally horizontal and closed position to an upwardly angled open position. In another aspect of the present invention, an entire vehicle body panel is initially movable from a closed position to a vertically raised intermediate position, and then subsequently pivoted to an open and somewhat vertically angled position.

36 Claims, 16 Drawing Sheets

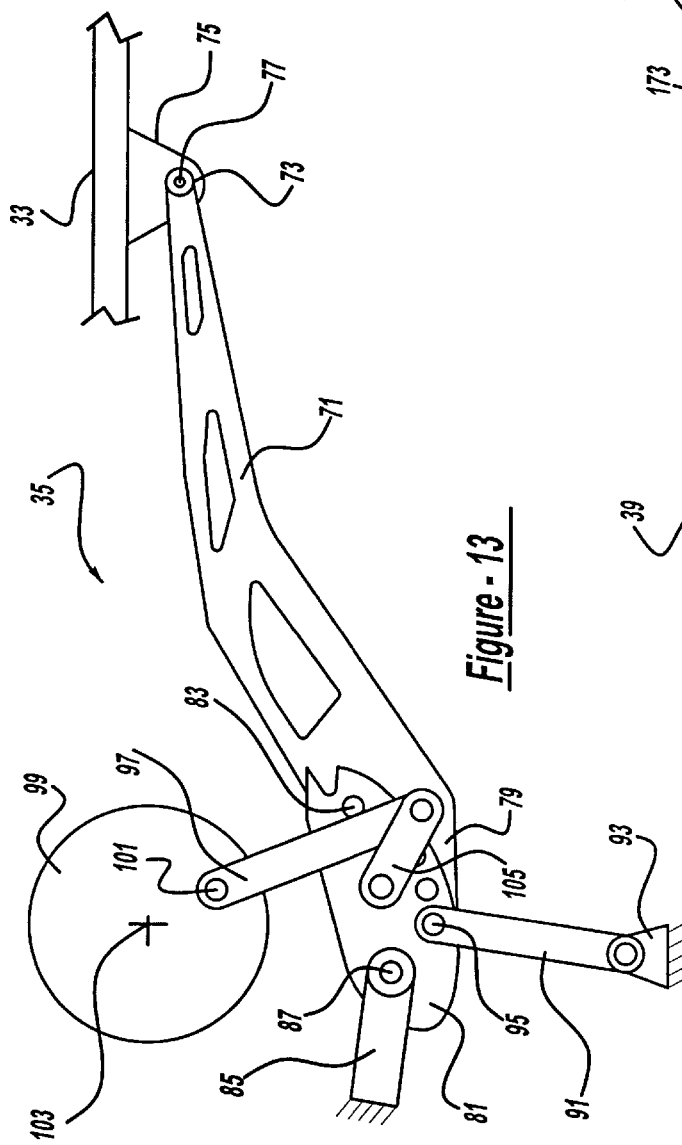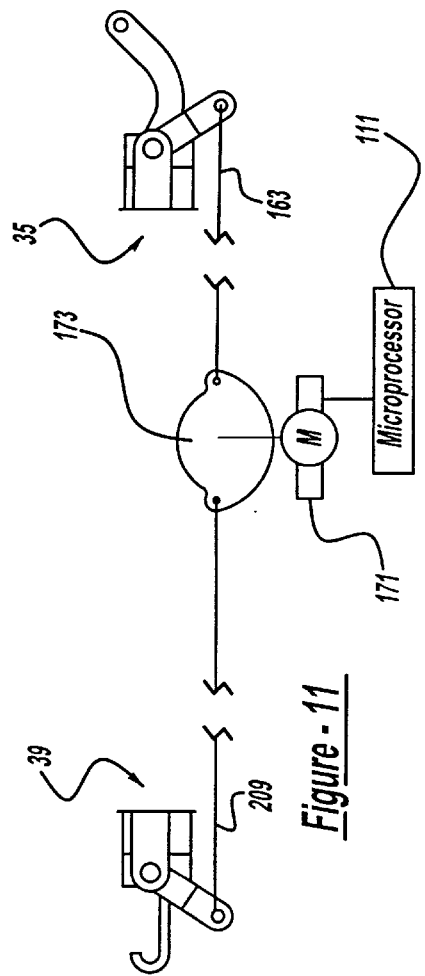

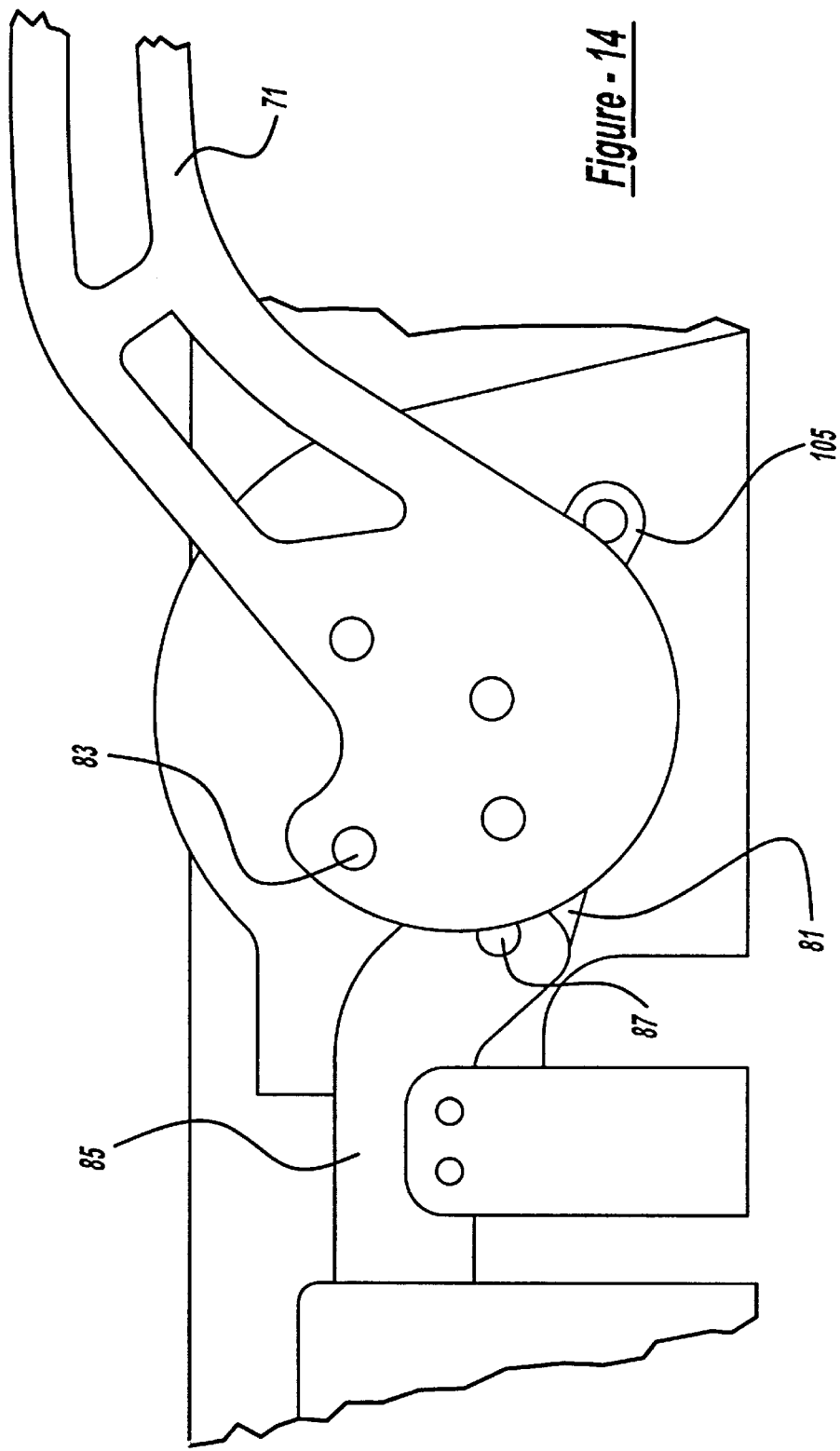

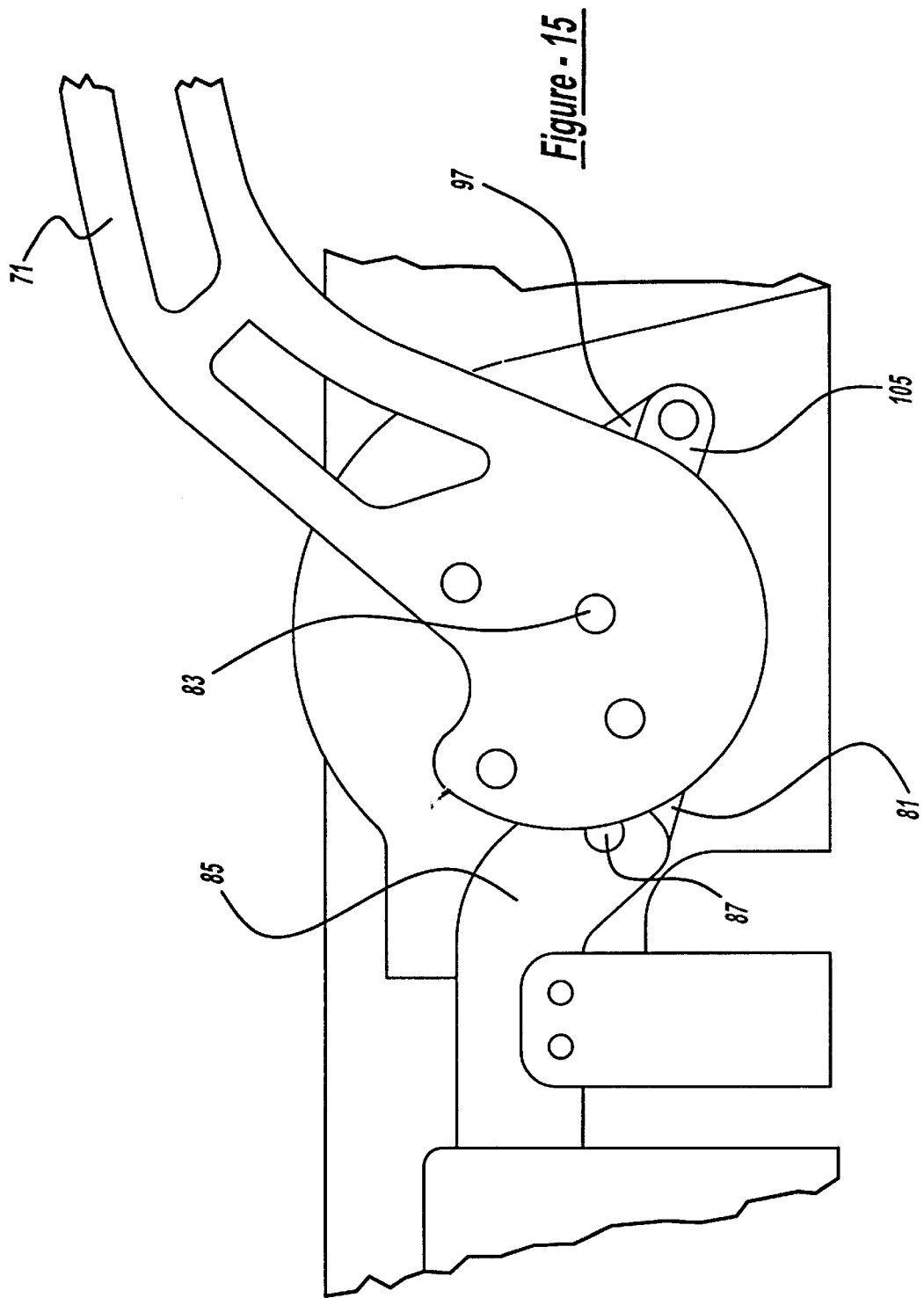

AUTOMOTIVE VEHICLE HOOD SYSTEM

BACKGROUND AND SUMMARY OF THE INVENTION

This invention relates generally to automotive vehicles and more specifically to an openable body panel system of an automotive vehicle.

It is well known in the automotive industry to employ a movable hood which covers an engine compartment. Many traditional constructions have a pair of gooseneck hinges mounting the hood to the rear of the engine compartment, and a clock spring or pneumatic piston to maintain the open position of the hood. A manually releasable latch for securing the hood in a closed position is also typically employed. Other conventional hoods have been pivotally coupled to a side or front of the engine compartment. Examples of such conventional devices are disclosed in the following U.S. Pat. No. 2,672,942 entitled "Automotive Vehicle Hood Edge Bumper" which issued to Bayley on Mar. 23, 1954; U.S. Pat. No. 2,620,889 entitled "Combined Hinge and Latch Mechanism for Motor Car Hoods" which issued to McCormick on Dec. 9, 1952; and U.S. Pat. No. 2,311,965 entitled "Hood Latch" which issued to Reynolds on Feb. 23, 1943.

Another traditional design employs a double-acting hydraulic cylinder to raise a member such as a hood. This is disclosed in U.S. Pat. No. 6,067,021 entitled "Apparatus for Hydraulically Moving a Vehicle Part" which issued to Huber on May 23, 2000, and is incorporated by reference herein.

In accordance with the present invention, an automotive vehicle system employs a generally rigid body panel which is movable in an automatic manner from a generally horizontal and closed position to an upwardly angled open position. In another aspect of the present invention, an entire vehicle body panel is initially movable from a closed position to a vertically raised intermediate position, and then subsequently pivoted to an open and somewhat vertically angled position. Yet another aspect of the present invention provides for sideways crosscar opening of a body panel in a fully automated manner about a pivot axis projecting in a generally fore-and-aft vehicular direction. An additional aspect of the present invention employs a hinge mechanism for an openable body panel which is driven by an automatic actuator thereby varying the pivot axis positioning for the body panel. In another aspect of the present invention, an automated release latch for a body panel is coupled to an automated hinging mechanism. In still a further aspect of the present invention, a movable body panel is an engine compartment hood, a trunk or deck lid, or a convertible roof tonneau cover.

The automotive vehicle system of the present invention is advantageous over traditional constructions in that the present invention has an initial generally vertical movement to provide clearance to a highly contoured front upper corner of an adjacent passenger door panel prior to subsequent pivoted opening of the body panel, especially if the door is open. Furthermore, the present invention is operable in an automated manner in response to a single switch or remote energization by the vehicle occupant, wherein the vehicle occupant can raise and lower a hood, deck lid, tonneau cover or other somewhat horizontally closed body panel while remaining inside the vehicle. Moreover, the present invention preferably employs one or more electric motors to automatically drive the system components, such that the present invention is easier to package, more prone to modularized preassembly, requires less maintenance and is cleaner to operate, as compared to hydraulic systems. Additional advantages and features of the present invention will become apparent from the following description and appended claims, taken in conjunction with the accompanying drawings.

BRIEF DESCRIPTION OF THE DRAWINGS

FIG. 11 is a diagrammatic rear view showing the automatic actuation assembly for the latch and hinge mechanisms employed in the preferred embodiment hood system;

FIG. 13 is a diagrammatic front view showing an automated actuator and the lifting mechanism employed in the preferred embodiment hood system;

FIG. 14 is a fragmentary front elevational view showing the preferred embodiment hood system, with the lifting mechanism disposed in the closed hood position;

FIG. 15 is a fragmentary front elevational view showing the preferred embodiment hood system, with the lifting mechanism disposed in the intermediate hood position;

DETAILED DESCRIPTION OF THE PREFERRED EMBODIMENT

Figure 5:
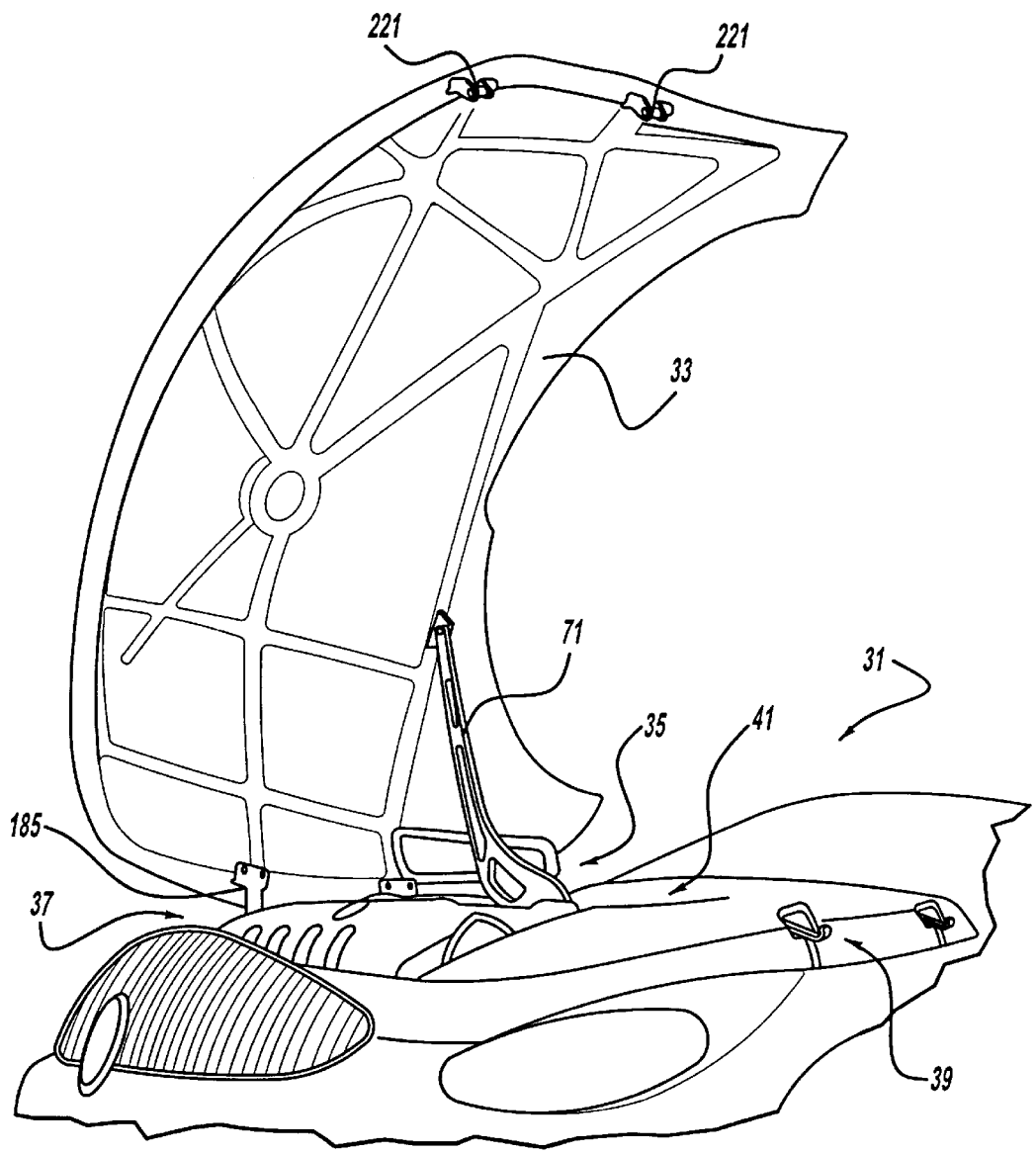
FIG. 5 is a perspective view showing the preferred embodiment hood system, with the hood disposed in the fully open position.

The automotive vehicle system of the present invention is ideally suited for use with generally rigid body panels, such as hoods, trunk or deck lids, and tonneau covers, which are movable relative to the adjacent and stationary vehicle body. In the preferred embodiment, as shown in FIG. 5, an automotive vehicle 31 employs a generally rigid hood 33, a lifting mechanism 35, a hinge mechanism 37 and a latch mechanism 39. An engine compartment 41 is operably covered by hood 33 when the hood is in its closed position. It should be appreciated that the hood and engine compartment may be disposed behind a passenger compartment of the vehicle for a rear engine vehicle. Hood 33 is preferably made from a lightweight material such as sheet aluminum, fiberglass, a polymer or the like, but can also be stamped from steel.

Figure 1:
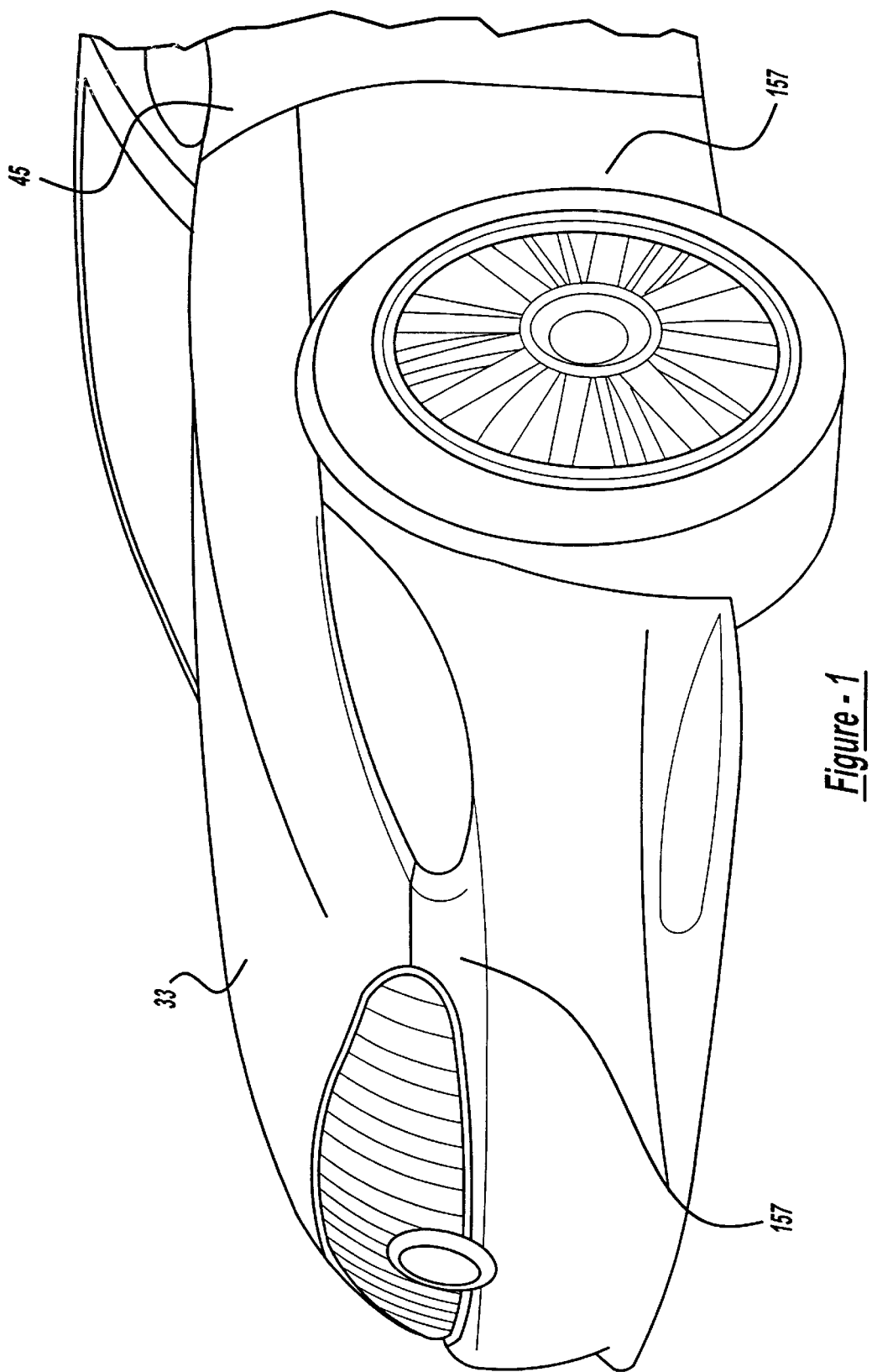
FIG. 1 is a perspective view showing the preferred embodiment of an automotive vehicle hood system of the present invention, with the hood disposed in a closed position.
Figure 2:
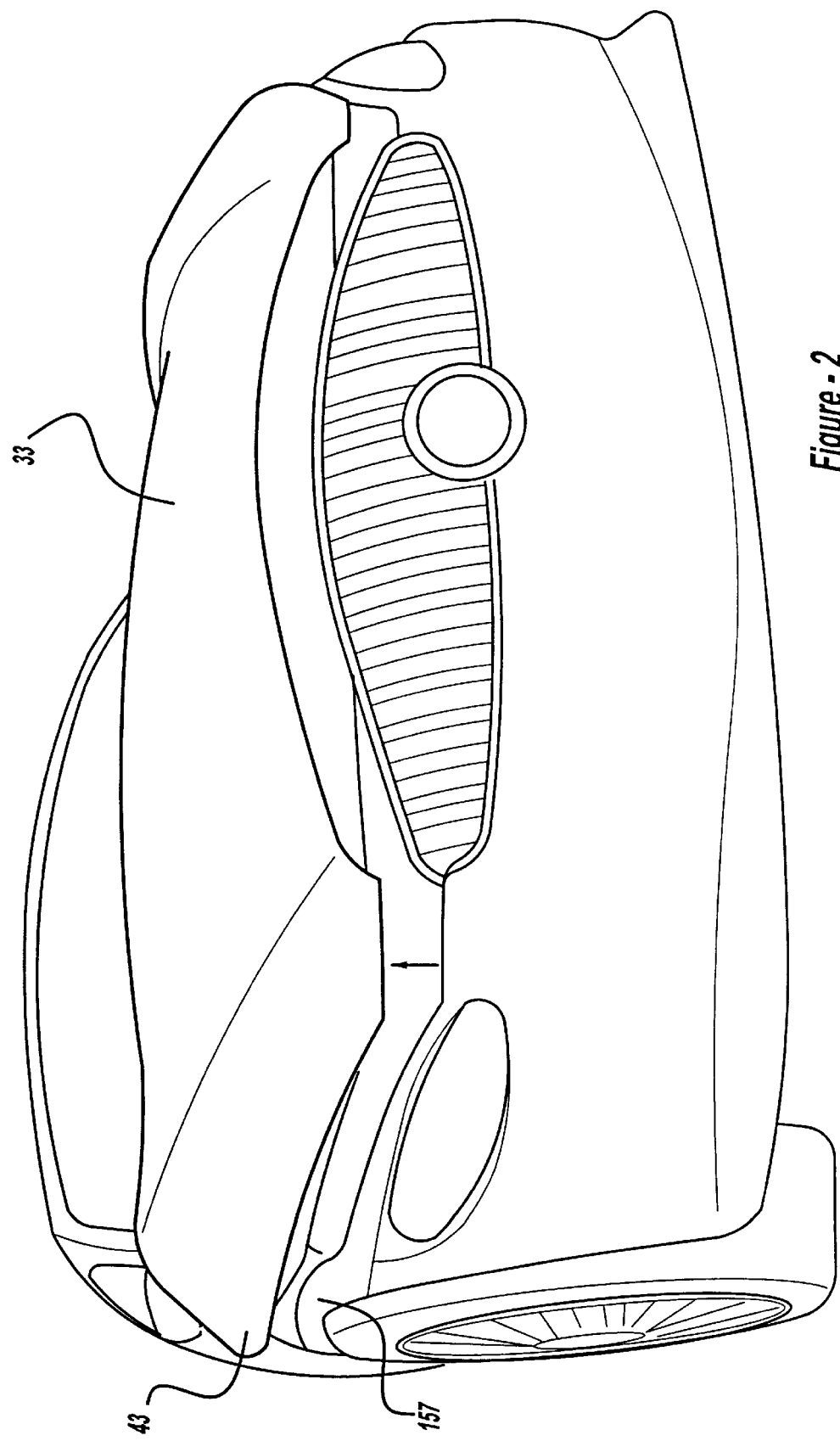
FIG. 2 is a perspective view showing the preferred embodiment hood system, with the hood disposed in a vertically raised intermediate position.
Figure 3:
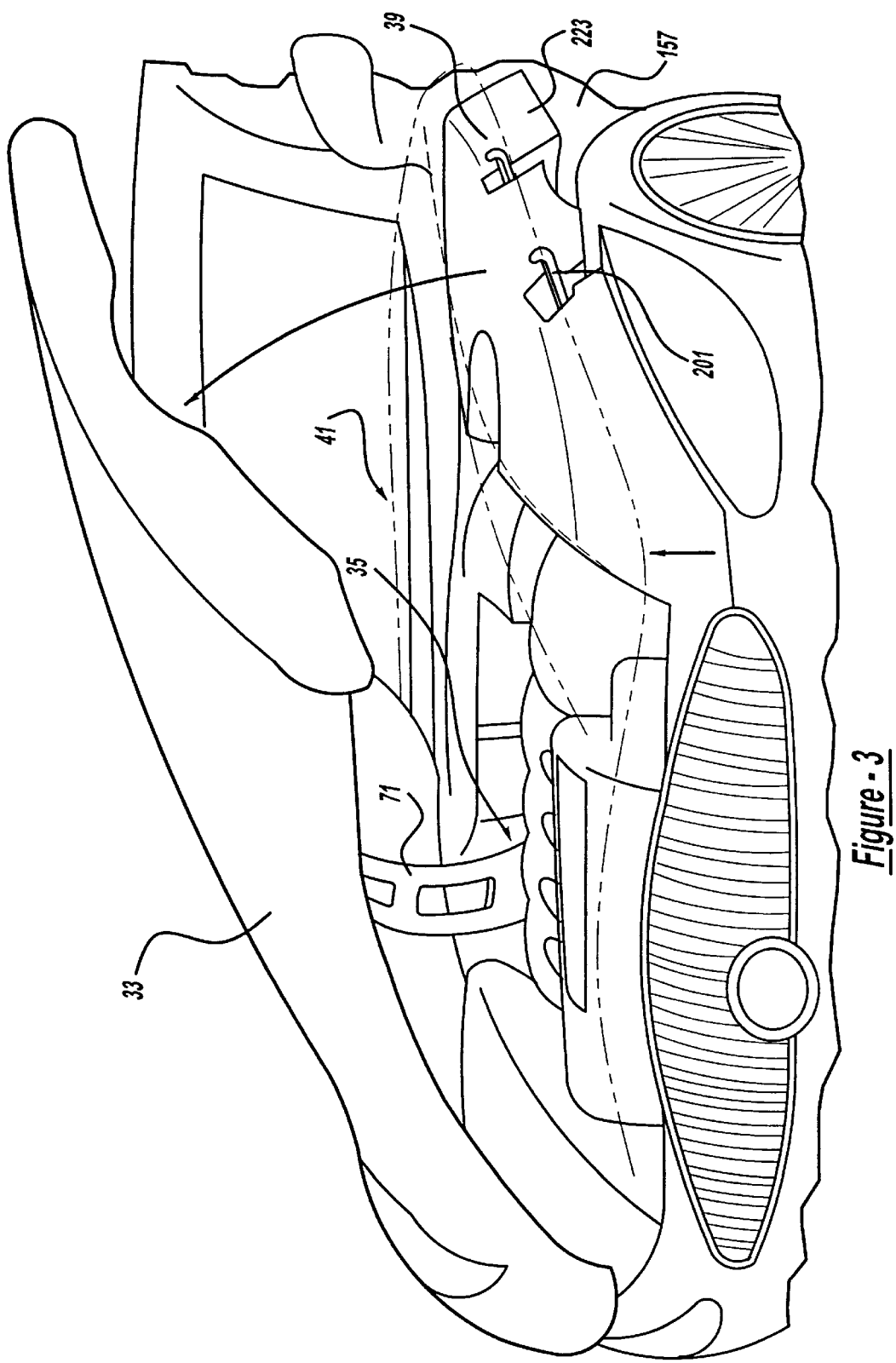
FIG. 3 is a perspective view showing the preferred embodiment hood system, with the hood disposed in a partially pivoted open position.
Figure 4:
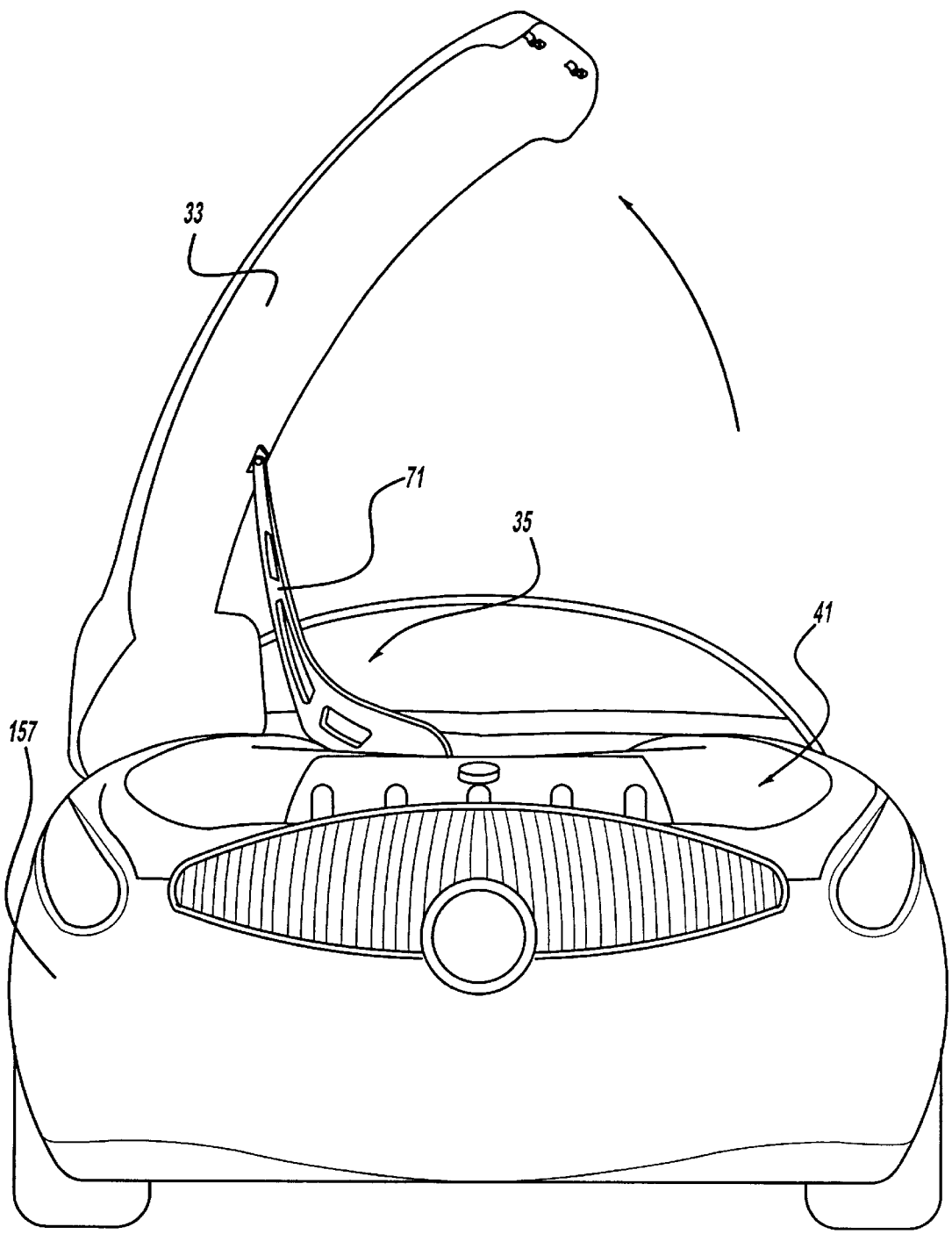
FIG. 4 is a front elevational view showing the preferred embodiment hood system, with the hood disposed in a fully raised and open position.

Hood 33 is initially disposed in a predominately horizontal and closed position above the engine compartment, as is illustrated in FIG. 1. FIG. 2 shows hood 33 in a vertically raised and still predominately horizontal intermediate position, while hood 33 is illustrated in a partially pivoted position in FIG. 3. Referring to FIGS. 4 and 5, hood 33 is located in a somewhat vertically angled open position; this fully open position is greater than 45 degrees from the closed and intermediate positions. Hood 33 is pivoted along a crosscar and vertically extending plane between the intermediate and open positions. This allows occupant access to the engine compartment from outside the vehicle. Furthermore, the vertically raised, but not yet pivoted, intermediate position is beneficial by allowing increased clearance between a lateral and rear corner 43 (see FIG. 2) of hood 33 and the adjacent front upper corner of a front passenger door 45 (see FIG. 1) prior to the opening rotation of hood 33. This eliminates the interference condition that would otherwise exist between the adjacent portions of the hood and door but for the vertical hood movement; especially if the passenger door is open. Closing movement of hood 33 is sequentially opposite the aforementioned opening movement.

Figure 12:
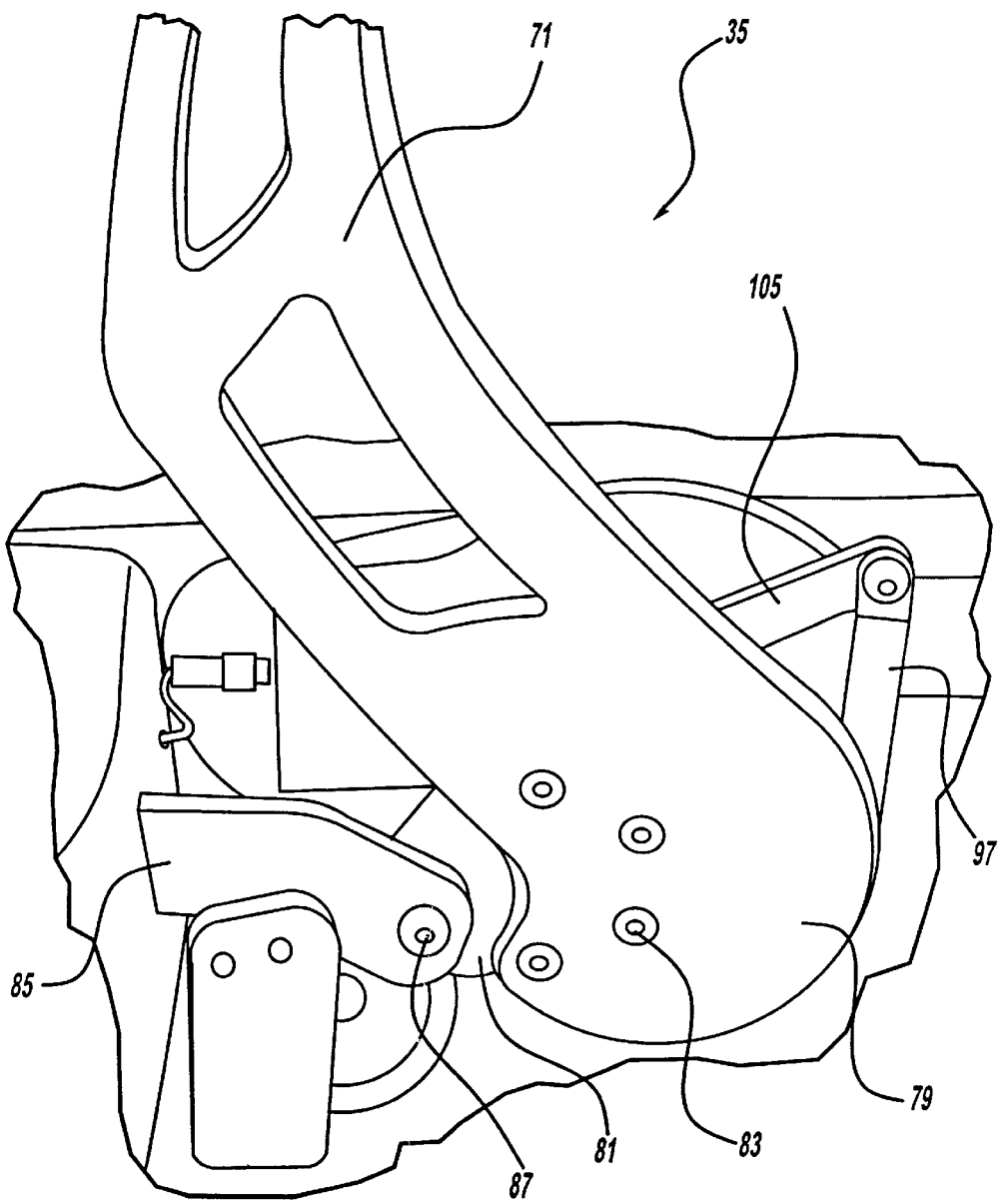
FIG. 12 is a front perspective view showing a lifting mechanism employed in the preferred embodiment hood system.

Lifting mechanism 35 is disclosed in greater detail in FIGS. 12 and 13. Lifting mechanism 35 includes an elongated driving arm 71 which has a distal end 73 coupled to a hood mounted bracket 75 by a pivot pin 77. It may be necessary to also use a bushing around the pivot pin. A proximal end 79 of driving arm 71 has a curved and enlarged portion which is affixed to a somewhat oval support plate 81 through a set of bolts 83. A stationary mount 85 is secured to the vehicle body and is coupled to plate 81 by a pivot pin 87. Pivot pin 87 defines a stationary rotational axis about which drive arm 71 is journalled. A pneumatic or spring biased piston and cylinder assembly 91 is coupled at one end to a bracket 93 affixed to the vehicle body and at the other end is pivotally coupled to plate 81 by a pivot pin 95. Piston and cylinder assembly 91 serve to openly bias hood 33 such that the weight of hood 33 does not overcome the actuating force of lifting mechanism 35 when the hood is partially open. Furthermore, a driving link 97 is rotatably coupled to a fractional horsepower, direct current pancake-style electric motor 99 at a pivot pin 101. Pivot pin 101 is laterally offset from a central axis 103 of motor 99. A secondary link 105 couples an opposite end of driving link 97 to a center of plate 81. Links 97 and 105 can articulate relative to each other. Thus, electric motor 99 provides the automatic actuation for lifting mechanism 35 and the correspondingly attached section of hood 33. Motor 99 is controlled by a microprocessor 111, as is shown in FIG. 11. Alternately, an analog or other electrical control system can be used in place of the microprocessor.

Figure 10:
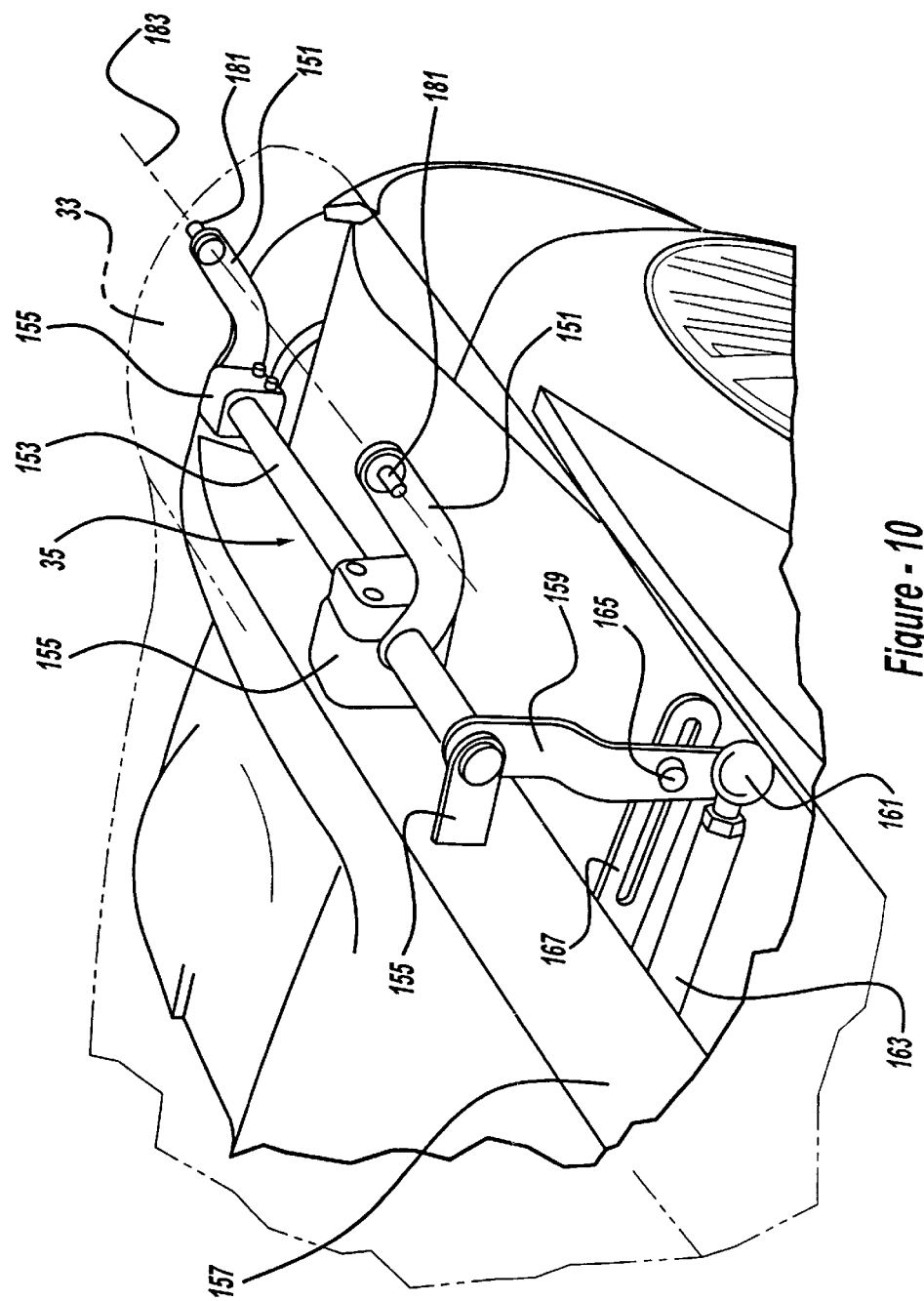
FIG. 10 is a fragmentary perspective view showing the preferred embodiment hood system, with the hinge mechanism disposed in a lowered position and the hood disposed in its closed position.

Referring now to FIGS. 10 and 11, hinging mechanism 37 employs a pair of elongated and curved hinge arms 151 which are affixed to a circular-cylindrical shaft 153 journalled within a set of brackets 155 mounted to vehicle body 157. A first end of an offset lever 159 is secured to shaft 153 and an opposite end of lever 159 is coupled to a swivel connection 161 of an elongated and generally rigid rod 163. A pin 165 projecting from a face of lever 159 slides within a slotted member 167. A second electric motor actuator 171, energizably controlled by microprocessor 111, is coupled to a bellcrank 173 which, in turn, is coupled to rod 163. Alternately, motor 171 can push or pull a bowden cable or cable and pulley system, which are coupled to lever 159. Electric motor 171 is a conventional sunroof-style fractional horsepower, direct current electric motor. Accordingly, energization of electric motor 171 serves to rotate bellcrank 173 which causes linear pushing or pulling of rod 163. Movement of rod 163 operably rotates lever 159 and the attached shaft 153. This further causes rotation of hinge arms 151 and the hood pivot pins 181 attached thereon. Thus, a hood pivot axis 183, which extends in a generally fore-and-aft or longitudinal direction of the vehicle, is vertically raised and lowered in an arcuate rotational manner through automatic actuation. Brackets 185 (see FIG. 5) secured to a laterally outboard section of hood 33 are pivotally coupled to pivot pins 181.

Figure 6:
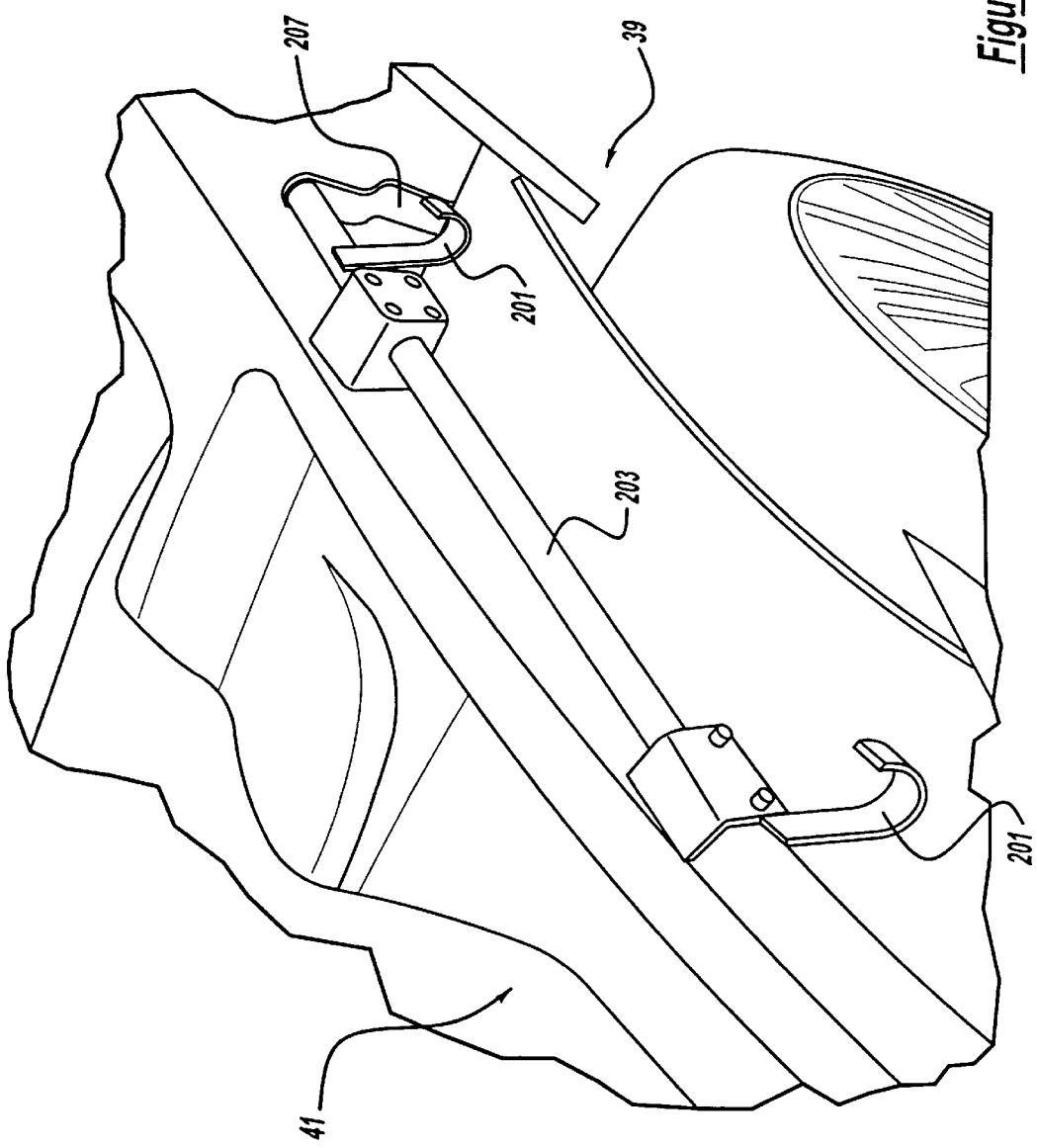
FIG. 6 is a fragmentary perspective view showing the preferred embodiment hood system, with a latch mechanism disposed in an unlatched position.
Figure 7:
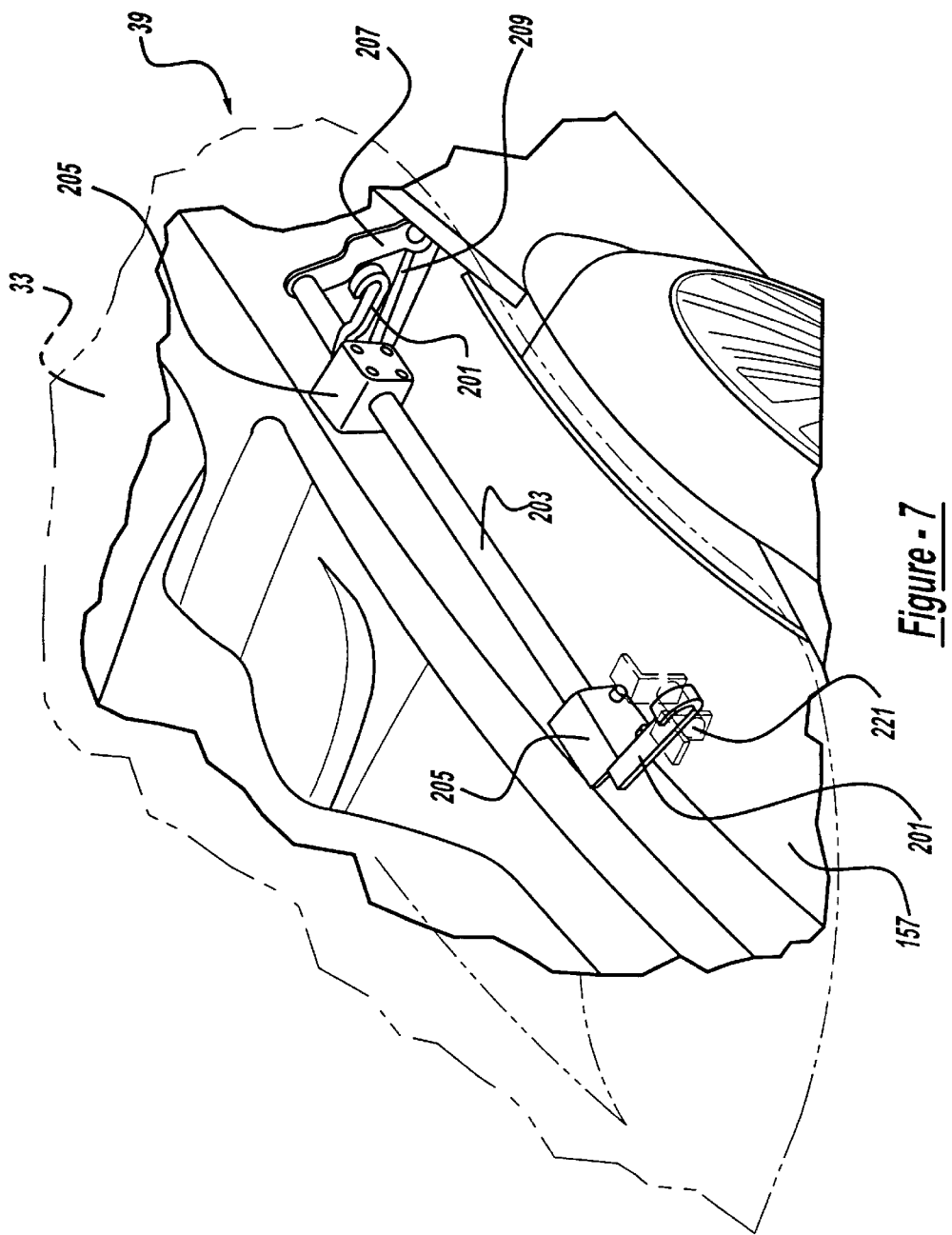
FIG. 7 is a fragmentary perspective view showing the preferred embodiment hood system, with the latch mechanism disposed in a latched position.

FIGS. 7 and 11 illustrate latching mechanism 39 in greater detail. Latching mechanism 39 includes a pair of J-hook latches 201 mounted to a circular-cylindrical shaft 203. Shaft 203 is journalled within a pair of brackets 205 secured to vehicle body 157 on the opposite outboard side of the engine compartment from hinge mechanism 37. An offset lever 207 has a first end secured to shaft 203 and a second end pivotally coupled to an elongated rod 209, similar to that of rod 163. Rod 209 is coupled to bellcrank 173 and is driven by electric motor 171. It is also envisioned that a lost motion coupling (such as slotted cams and pins) or separate motors can be employed when coupling the latch and hinge mechanisms to the bellcrank or the like due to potentially different timing needs for actuation. Thus, energization of electric motor 171 causes rod 209 to rotate lever 207, shaft 203 and latches 201 from a latching orientation as shown in FIG. 7, wherein the current hooks engage strikers 221 affixed to a laterally outboard section of hood 33, to the unlatched positions shown in FIG. 6, which allows free opening movement of hood 33 away from the vehicle body. Polymeric shrouds 223 (see FIG. 3) having access slots for the latches and hinge arms, are used to cover and aesthetically hide the majority of the latch and hinge mechanisms from view.

Figure 8:
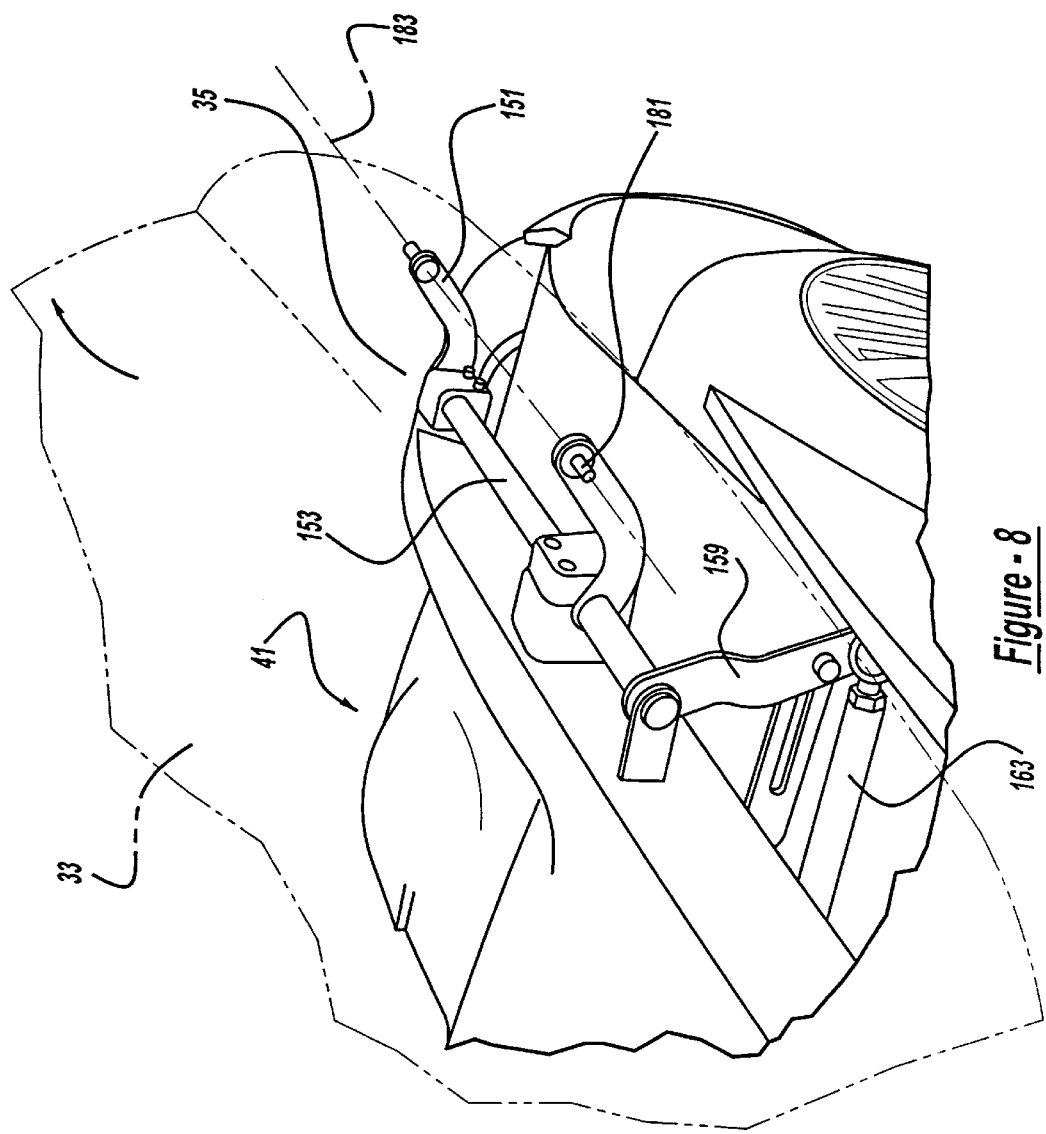
FIG. 8 is a fragmentary perspective view showing the preferred embodiment hood system, with a hinge mechanism disposed in a raised position and with the hood disposed in its open position.
Figure 9:
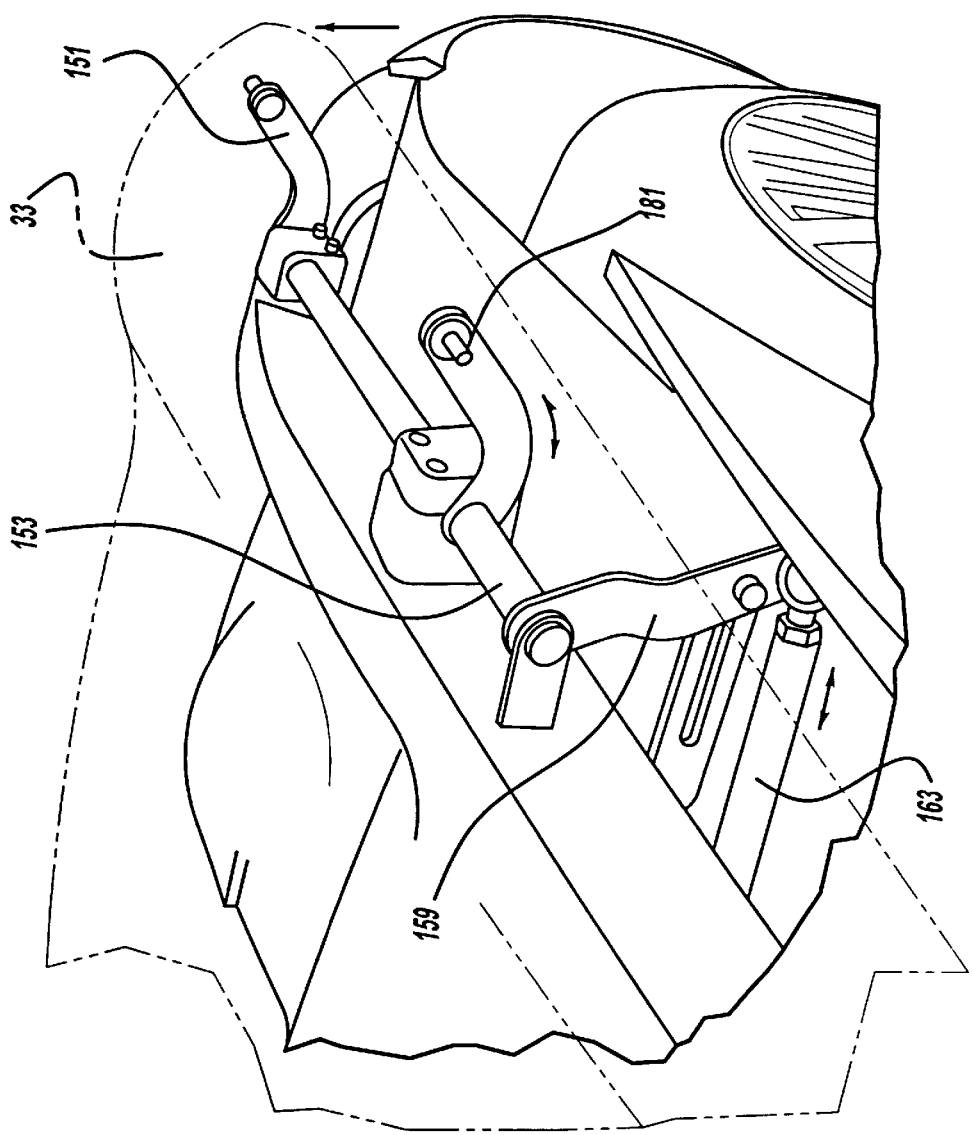
FIG. 9 is a fragmentary perspective view showing the preferred embodiment hood system, with the hinge mechanism disposed in the raised position and the hood disposed in the intermediate position.
Figure 16:
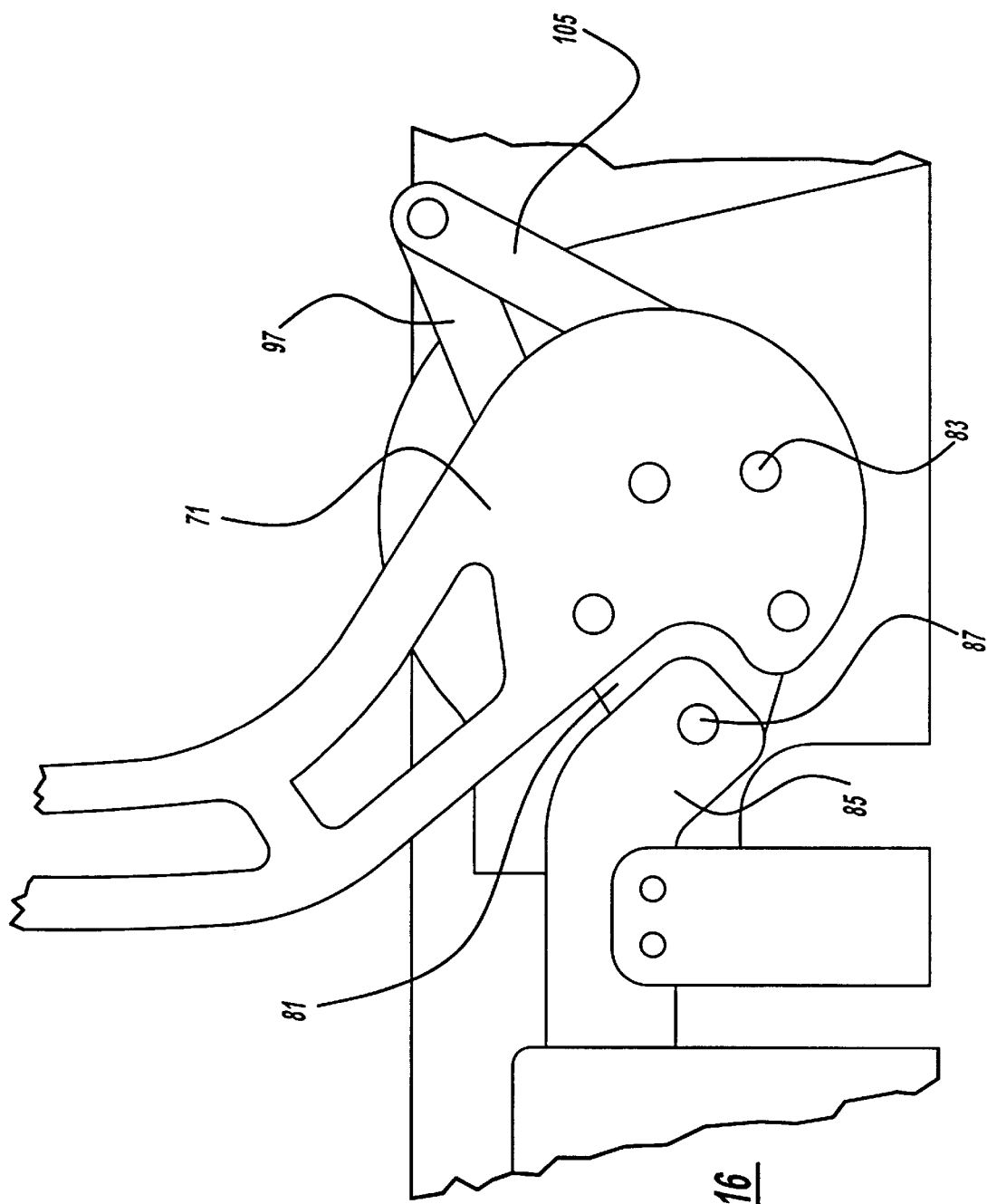
FIG. 16 is a fragmentary front elevational view showing the preferred embodiment hood system, with the lifting mechanism disposed in the fully open hood position.

The sequence of hood movement will now be discussed in more detail hereinafter with reference to FIGS. 1, 2, 4, 8–10 and 14–16. FIGS. 1, 10 and 14 show hood 33 in the generally horizontal and closed position. In this position, lifting mechanism 35 is fully retracted and hood pivot axis 183 of hinge mechanism 37 is fully lowered. When hood 33 is vertically raised approximately four inches to its intermediate and generally horizontal position as shown in FIGS. 2, 9 and 15, lifting mechanism 35 is rotationally advanced a predetermined angular amount while hinge mechanism 37 is simultaneously rotationally moved. This causes a generally straight vertical lifting of the entire hood 33, including lifting both the hinge side and the latch side a substantially identical distance as seen in FIG. 2. Further advancing rotation of lifting mechanism 35, while maintaining the previously reached maximum height orientation of hinge mechanism 37, causes sideways rotation of hood 33 about pivot axis 183 to the open hood position as is shown in FIGS. 4, 8 and 16. Again, closing of hood 33 will require a reversal of this sequence of movements. Moreover, the automotive vehicle is typically stationary when the hood is raised to its open position.

Limit switches, potentiometers or other movement sensors are electrically connected to the microprocessor in order to monitor movement of the corresponding componentry. Furthermore, a vehicle occupant accessible switch or voice recognition module can be located within the passenger compartment or on a remote key fob to initiate opening or closing of the hood. Such a switch is connected to the microprocessor.

An alternate embodiment of the present invention automotive vehicle system is shown in FIGS. 17–21. In this embodiment, the previously disclosed lifting, hinge and latch mechanisms are employed to operate a rigid tonneau cover body panel 301 and trunk lid body panel 303 relative to the vehicle body. This is ideally suited for an automotive vehicle employing a retractable convertible roof 305. Examples of known convertible roof and tonneau cover arrangements are disclosed in commonly assigned U.S. Pat. No. 5,785,375 entitled "Retractable Hard-Top for an Automotive Vehicle" which issued to Alexander et al. on Jul. 28, 1998; U.S. Pat. No. 5,772,274 entitled "Motorized Drive System for a Convertible Roof of an Automotive Vehicle" which issued to Tokarz on Jun. 30, 1998; and U.S. Pat. No. 5,743,587 entitled "Apparatus for Use in an Automotive Vehicle having a Convertible Roof System" which issued to Alexander et al. on Apr. 28, 1998; all of these patents are incorporated by reference herein.

Figure 17:
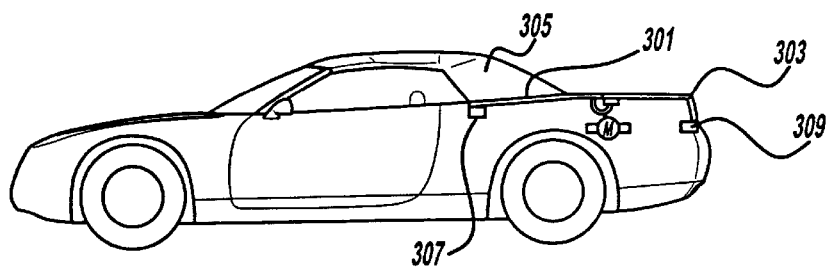
FIG. 17 is a diagrammatic side view showing an alternate embodiment of the automotive vehicle system, showing a tonneau cover and trunk lid in closed positions.
Figure 18:
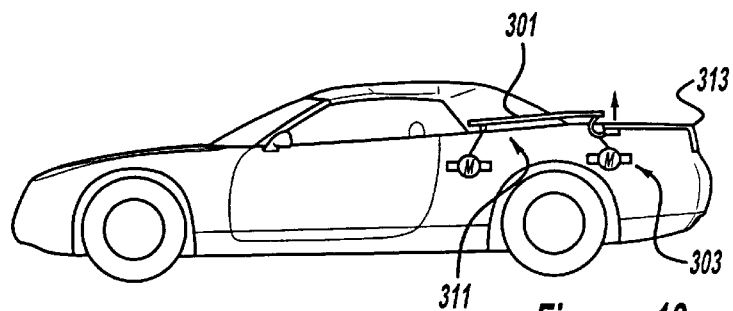
FIG. 18 is a diagrammatic side view showing the alternate embodiment automotive vehicle system, with the tonneau cover in a vertically raised intermediate position.
Figure 19:
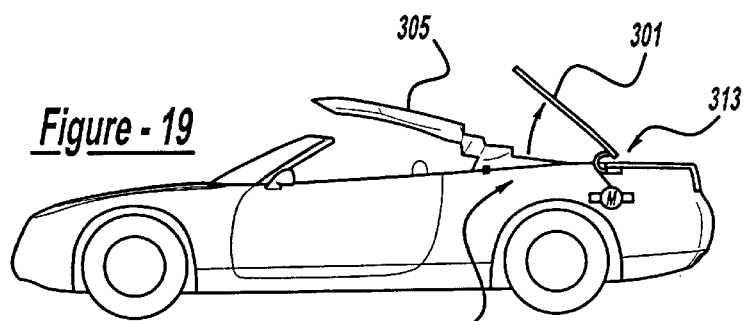
FIG. 19 is a diagrammatic side view showing the alternate embodiment automotive vehicle system, with the tonneau cover in a fully raised and open position.
Figure 20:
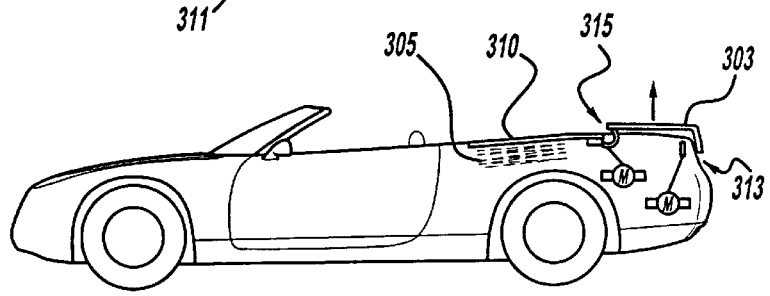
FIG. 20 is a diagrammatic side view showing the alternate embodiment automotive vehicle system, with the trunk lid disposed in a vertically raised intermediate position.
Figure 21:
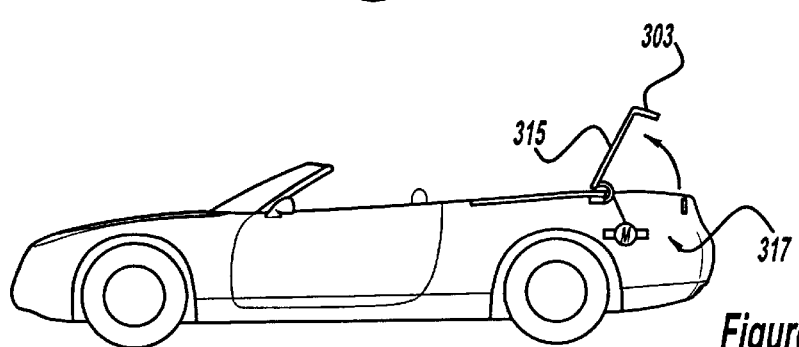
FIG. 21 is a diagrammatic side view showing the alternate embodiment automotive vehicle system, with the trunk lid disposed in a fully raised and open position.

FIG. 17 shows the convertible roof 305 in a raised position covering a passenger compartment. Tonneau cover 301 is illustrated in a closed and generally horizontal position engaged by a latch mechanism 307, and trunk lid 303 is shown in a generally horizontal and closed position also engaged by a latch mechanism 309. Referring to FIG. 18, tonneau cover 301 is located in a vertically raised intermediate position. A lifting mechanism 311 and hinge mechanism 313 are advanced by their associated electric motor actuators 303 to vertically raise tonneau cover 301 to its intermediate position. In FIG. 19, lifting mechanism 311 has been further advanced to openly pivot tonneau cover 301 in order to allow access of convertible roof 305 into the boot or roof storage area inside the vehicle body. FIG. 20 shows tonneau cover 301 returned to its closed position.

FIG. 20 further shows trunk lid 303 vertically raised to an intermediate position through simultaneous and automatic actuation of hinge mechanism 315 and lifting mechanism 317 (see FIG. 21), which are driven by their associated electric motors. Thereafter, further advancing of lifting mechanism 317 serves to openly rotate trunk lid 303 about the maintained raised pivot axis of hinge mechanism 315. In the tonneau cover and trunk lid constructions shown, the panel pivot axis is disclosed as extending in a crosscar direction, generally perpendicular to that of pivot axis 183 of hood 33 (see FIG. 8). It should be appreciated, however, that the pivot axes for the hood, tonneau cover and trunk lid may have different orientations depending on whether front, back or side opening and access is desired for a specific vehicle. It is also noteworthy that the hood, tonneau cover and trunk lid panels are generally at or below a belt-line (i.e., where the window bottoms meet the body panels) of the vehicle, when closed.

While various embodiments of the automotive vehicle system have been disclosed herein, it should be appreciated that variations may be employed within the scope of the present invention. For example, an automatic hydraulic actuation system may be provided in place of or in addition to the electric motors, although not all of the advantages of the present invention will be achieved. Furthermore, the disclosed hinge components and movement may be replaced by a camming or scissor arm construction as long as essentially linear vertical or oblique movement is realized. Similarly, linearly sliding latches can be substituted for the presently disclosed rotating hooks. Moreover, cams and slot type couplings or planetary gear couplings may be added to the lifting mechanism in order to maximize mechanical advantages during movement. Finally, the hood may also be opened to a fully vertical orientation without interfering with a windshield as in traditional constructions. While various materials, dimensions and linkage arrangements have been disclosed, it should be appreciated that other materials, dimensions and couplings can be employed. It is intended by the following claims to cover these and any other departures from the disclosed embodiments which fall within the true spirit of this invention.

The invention claimed is:

1. A system for use in an automotive vehicle, the system comprising:

a lifting mechanism; and a substantially horizontal body panel having a hinge side and a latch side, the body panel being coupled to the lifting mechanism;

the lifting mechanism being operable to first raise both the hinge side and the latch side of the body panel a substantially identical vertical distance and then subsequently pivot the body panel to an upwardly angled open position, if it is desired to open the body panel; and the body panel being located substantially adjacent or below the belt-line of the vehicle when the body panel is in its closed position.

2. The system of claim 1 wherein the lifting mechanism includes an automatic actuator.

3. The system of claim 2 wherein the automatic actuator is an electric motor.

4. The system of claim 3 wherein the lifting mechanism further includes a mechanical coupling and an elongated driving arm, the coupling directly connecting the electric motor to the driving arm and, the driving arm being pivotally coupled to the body panel.

5. The system of claim 1 wherein the lifting mechanism includes:

an elongated driving arm having a first end coupled to the body panel, the driving arm further having an opposite second end;

a stationary member having an end rotatably coupled to the second end of the driving arm at a first pivot point; and a link coupled to the driving arm at a second pivot point adjacent the second end of the driving arm, the first and second pivot points being offset from each other, movement of the link operably causing the driving arm to rotate about the first pivot point while raising and lowering the body panel.

6. The system of claim 5 wherein the lifting mechanism further includes a fluid powered strut coupled to the driving arm.

7. The system of claim 1 further comprising a hinging mechanism attached adjacent an edge of the body panel, the hinging mechanism including at least one elongated member having a pivot for the body panel, the at least one elongated member being movable during initial opening movement of the body panel in order to raise the pivot of the body panel in at least a substantially vertical direction prior to full rotational opening of the body panel.

8. The system of claim 7 wherein the hinging mechanism is coupled to an automatic actuator, and energization of the automatic actuator operably moves the hinging mechanism.

9. The system of claim 1 further comprising a hinging mechanism coupling the body panel to a lateral side of the vehicle such that the body panel is pivoted about a fore-and-aft pivot axis.

10. The system of claim 1 wherein the body panel is an engine compartment hood.

11. The system of claim 1 wherein the body panel is a substantially rigid tonneau cover.

12. The system of claim 1 wherein the body panel is a trunk lid.

13. An automotive vehicle apparatus comprising:
an engine compartment hood movable in a crosscar direction from a substantially horizontal closed position to a raised and rotated open position, the open position being rotated at least about 45 degrees from the substantially horizontal closed position;
a lifting mechanism coupled to the hood; and
an electric motor coupled to the lifting mechanism free of fluid-powered actuation, wherein energization of the electric motor drives the lifting mechanism which, in turn, opens the hood.

14. The apparatus of claim 13 further comprising:
a hinge coupled to a first lateral section of the hood and having a substantially fore-and-aft hood pivot axis; and
a latch attachable to second and opposite lateral section-of the hood when the hood is in its closed position;
the latch being automatically disengagable from the hood if it is desired to open the hood.

15. The apparatus of claim 14 wherein at least a portion of the hinge is movable in order to raise the pivot axis of the hood in a substantially vertical direction prior to rotational opening of the hood.

16. The apparatus of claim 15 further comprising at least one automatic actuator coupled to the hinge and the latch.

17. The apparatus of claim 13 wherein the lifting mechanism includes:
an elongated driving arm having a first end coupled to the body panel, the driving arm further having an opposite second end;
a stationary member having an end rotatably coupled to the second end of the driving arm at a first pivot point; and
a link coupled to the driving arm at a second pivot point adjacent the second end of the driving arm, the first and second pivot points being offset from each other, movement of the link operably causing the driving arm to rotate about the first pivot point while raising and lowering the body panel.

18. An automotive vehicle apparatus comprising:
an engine compartment hood movable in a crosscar direction from a substantially horizontal closed position to a raised and rotated open position;
a lifting mechanism coupled to the hood, the lifting mechanism having a mechanical coupling and an elongated driving arm, the coupling directly connecting an electric motor to the driving arm and, the driving arm being pivotally coupled to the engine compartment hood; and
an electric motor coupled to the lifting mechanism free of fluid-powered actuation, wherein energization of the electric motor drives the lifting mechanism which, in turn, opens the hood.

19. An automotive vehicle apparatus comprising:
an engine compartment hood movable in a crosscar direction from a substantially horizontal closed position to a raised and rotated open position;
a lifting mechanism coupled to the hood;
an electric motor coupled to the lifting mechanism free of fluid-powered actuation, wherein energization of the electric motor drives the lifting mechanism which, in turn, opens the hood; and
a hinge attached adjacent an edge of the hood, the hinge including an least one elongated member having a pivot for the hood, the elongated member being movable during initial opening movement of the hood in order to raise the pivot of the hood in at least a substantially vertical direction prior to full rotational opening of the hood.

20. An automotive vehicle comprising:
vehicle body having a body compartment and a roof;
a substantially rigid body panel movable from a substantially horizontal and closed position covering the body compartment to an open position, a substantially horizontal plane of the body panel being located substantially below a majority of the roof when the body panel is in its closed position and the roof is in its raised position;
a hinge assembly coupling the body panel to the body, the hinge assembly having a pivot axis about which the body panel pivots, the hinge assembly being coupled to the body panel at the pivot axis; and
an automatic actuator coupled to the hinge assembly, energization of the actuator automatically causing at least a portion of the hinge assembly to move which causes the pivot axis to move to a displaced position, continued energization thereafter causing the body panel to pivot about the pivot axis in the displaced position;
wherein the pivot axis is raised in a substantially vertical manner while maintaining the body panel in a substantially horizontal orientation prior to rotational movement of the body panel.

21. The vehicle of claim 20 wherein the actuator is an electric motor.

22. The vehicle of claim 21 further comprising a bellcrank and an elongated member couple the electric motor to the hinge assembly.

23. The vehicle of claim 20 wherein the hinge assembly includes:
at least two elongated arms, the pivot axis being located adjacent an end of the arms;

a shaft coupled to an end of the arms opposite from the pivot axis; and a lever mounted to the shaft;

wherein the actuator operably rotates the lever which, in turn, rotates the shaft and arms, thereby moving the pivot axis.

24. The vehicle of claim 20 further comprising a latch engagable with the body panel when the body panel is in its closed position, the latch being operably driven by the actuator.

25. The vehicle of claim 20 wherein the body compartment is an engine compartment and the body panel is a hood.

26. The vehicle of claim 20 wherein the body panel is a trunk lid.

27. The vehicle of claim 20 further comprising a convertible roof, wherein the body panel is a convertible roof tonneau cover operable to cover at least part of the convertible roof when retracted.

28. A method of operating an automotive vehicle system, the system including a substantially rigid body panel and an automatic actuator, the method comprising:

(a) raising the entire body panel in a substantially vertical direction from a substantially horizontal closed position to a substantially horizontal intermediate position;

(b) rotating the body panel from the intermediate position to an upwardly angled open position, after step (a); and (c) energizing the actuator in order to automatically move the body panel between the positions free of manual intervention after initial energization of the actuator.

29. The method of claim 28 further comprising rotating the body panel about a pivot axis extending in a substantially fore-and-aft direction during opening and closing.

30. The method of claim 28 further comprising automatically unlatching the body panel prior to movement of the body panel from the closed position to the intermediate position, free of manual intervention after the initial energization of the actuator.

31. The method of claim 28 further comprising allowing access to an engine compartment by opening the body panel which is an engine compartment hood.

32. The method of claim 28 further comprising allowing access to a trunk by opening the body panel which is a trunk lid.

33. The method of claim 28 further comprising allowing a convertible roof to be retracted into a storage compartment by opening the body panel which is a convertible roof tonneau cover.

34. A system for use in an automotive vehicle, the system comprising:

a lifting mechanism having an electric motor actuator, a mechanical coupling and an elongated driving arm, the mechanical coupling directly connecting the electric motor actuator to the driving arm; and a substantially horizontal body panel pivotally coupled to the driving arm of the lifting mechanism;

the lifting mechanism being operable to first raise the entire body panel in a substantially vertical direction and then subsequently pivot the body panel to an upwardly angled open position, if it is desired to move the body panel to an open position; and the body panel being located substantially adjacent or below the belt-line of the vehicle when the body panel is in a closed position.

35. A system for use in an automotive vehicle, the system comprising:

a lifting mechanism; and a substantially horizontal body panel coupled to the lifting mechanism;

the lifting mechanism being operable to first raise the entire body panel in a substantially vertical direction and then subsequently pivot the body panel to an upwardly angled open position, if it is desired to move the body panel to an open position;

a hinging mechanism coupling the body panel to a lateral side of the vehicle such that the body panel is pivoted about a fore-and-aft pivot axis; and the body panel being located substantially adjacent or below the belt-line of the vehicle when the body panel is in a closed position.

36. An automotive vehicle comprising:

a vehicle body having a body compartment and a roof;

a substantially rigid body panel movable from a substantially horizontal and closed position covering the body compartment to an open position, a substantially horizontal plane of the body panel being located substantially below a majority of the roof when the body panel is in its closed position and the roof is in its raised position;

a hinge assembly coupling the body panel to the body, the hinge assembly having a pivot axis, the hinge assembly being coupled to the body panel at the pivot axis; and an automatic actuator coupled to the hinge assembly, energization of the actuator automatically causing at least a portion of the hinge assembly to move which causes the pivot axis to become displaced;

wherein the pivot axis is raised in a substantially vertical manner while maintaining the body panel in a substantially horizontal orientation prior to rotational opening of the body panel.

* * * * *

UNITED STATES PATENT AND TRADEMARK OFFICE
CERTIFICATE OF CORRECTION

PATENT NO. : 6,568,495 B1
DATED : May 27, 2003
INVENTOR(S) : George A. Corder and James E. Tousignant It is certified that error appears in the above-identified patent and that said Letters Patent is hereby corrected as shown below:

Column 7,
Line 45, "section-of" should be -- section of --.

Column 8,
Line 28, "an" should be -- at --.
Line 62, "couple" should be -- coupled to --.

Signed and Sealed this

Twenty-third Day of September, 2003

JAMES E. ROGAN
*Director of the United States Patent and Trademark Office*